US010804000B2

(12) United States Patent
Nilsson et al.

(10) Patent No.: US 10,804,000 B2
(45) Date of Patent: Oct. 13, 2020

(54) HIGH EFFICIENCY CONTINUOUS-FLOW PRODUCTION OF RADIOISOTOPES

(71) Applicant: The Regents of the University of California, Oakland, CA (US)

(72) Inventors: Mikael Nilsson, Irvine, CA (US); Leila Safavi-Tehrani, Ladera Ranch, CA (US); George E. Miller, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 210 days.

(21) Appl. No.: 15/598,918

(22) Filed: May 18, 2017

(65) Prior Publication Data

US 2017/0337998 A1   Nov. 23, 2017

Related U.S. Application Data

(60) Provisional application No. 62/338,162, filed on May 18, 2016.

(51) Int. Cl.
*G21G 1/02* (2006.01)
*G21G 1/00* (2006.01)
(Continued)

(52) U.S. Cl.
CPC ........... *G21G 1/001* (2013.01); *C01B 25/451* (2013.01); *C07F 3/00* (2013.01); *G21G 1/06* (2013.01);
(Continued)

(58) Field of Classification Search
CPC ........ G21G 1/001; G21G 1/06; C01B 25/451; C07F 3/00
(Continued)

(56) References Cited

U.S. PATENT DOCUMENTS 3,708,392 A   1/1973   Campbell
6,143,431 A * 11/2000   Webster .................. G21G 1/10
376/158
(Continued)

OTHER PUBLICATIONS

Ozawa, Après ORIENT, A P&T-based New Resource Strategy in Nuclear Fuel Cycle, Bull. Res. Lab. Nucl. Reactor, vol. 37 , 2013, pp. 25-28. (Year: 2013).*
(Continued)

*Primary Examiner* — Jack W Keith
*Assistant Examiner* — Daniel Wasil
(74) *Attorney, Agent, or Firm* — Thomas|Horstemeyer LLP

(57) ABSTRACT

Methods and systems are provided for continuous-flow production of radioisotopes with high specific activity. Radioisotopes with high specific activity produced according to the methods described are also provided. The methods can include causing a liquid capture matrix to contact a target containing a target nuclide; irradiating the target with radiation, ionizing radiation, particles, or a combination thereof to produce the radionuclides that are ejected from the target and into the capture matrix; and causing the liquid capture matrix containing the radionuclides to flow from the target to recover the capture matrix containing the radionuclides with high specific activity. The methods are suitable for the production of a variety of radionuclides. For example, in some aspects the target nuclide is $^{237}$Np, and the radionuclide is $^{238}$Np that decays to produce $^{238}$Pu. In other aspects, the target nuclide is $^{98}$Mo, and the radionuclide is Mo that decays to produce $^{99m}$Tc.

19 Claims, 2 Drawing Sheets

(51) Int. Cl.
*C07F 3/00* (2006.01)
*C01B 25/45* (2006.01)
*G21G 1/06* (2006.01)

(52) U.S. Cl.
CPC .. *C01P 2006/44* (2013.01); *G21G 2001/0036* (2013.01)

(58) Field of Classification Search
USPC .................................................. 376/157, 189
See application file for complete search history.

(56) References Cited

U.S. PATENT DOCUMENTS

| | | | |
|---|---|---|---|
| 6,222,896 B1 | 4/2001 | Jia et al. | |
| 9,047,998 B2 | 6/2015 | Jansen et al. | |
| 2003/0007928 A1* | 1/2003 | Gray | A61K 51/06 424/9.3 |
| 2007/0081940 A1* | 4/2007 | O'Foghludha | G21G 4/06 424/1.11 |
| 2011/0118491 A1 | 5/2011 | Wolterbeek et al. | |

OTHER PUBLICATIONS

Goeij, "How do we define the concepts specific activity, radioactive concentration, carrier, carrier-free and no-carrier-added?" Journal of radioanalytical and nuclear chemistry 263, No. 1 (2005): 13-18. (Year: 2005).*
Vente Mad, Nijsen JFW, Roos R, et al (2009) Neutron activation of holmium poly(Llacticacid) microspheres for hepatic arterial radioembolization: a validation study. BiomedMicrodevices 11:763-772.
Mumper RJ, Jay M (1992) Poly(L-lactic acid) microspheres containing neutronactivatable holmium-165: a study of the physical characteristics of microspheres before and after irradiation in a nuclear reactor. Pharm Res 9:149-154.
Zielhuis SW, Nijsen JFW, de Roos R, et al (2006) Production of GMP-grade radioactive holmium loaded poly(L-lactic acid) microspheres for clinical application. Int J Pharm 311:69-74.
Nijsen JF, Zonnenberg BA, Woittiez JR, et al (1999) Holmium-166 poly lactic acid microspheres applicable for intra-arterial radionuclide therapy of hepatic malignancies: effects of preparation and neutron activation techniques. Eur J Nucl Med 26:699-704.
Buff W, Seevinck PR, Krijger GC, et al (2009) Microspheres with ultrahigh holmium content for radioablation of malignancies. Pharm Res 26:1371-1378.
National Aeronautics and Space Administration (NASA) What is Plutonium-238. NASA Facts. pp. 1-2.
Witze A (2014) Nuclear Power: Desperately Seeking Plutonium. Nature 515,Nov. 27, 2014. pp. 484-486.
Los Alamos National Laboratory Nuclear-Powered Cardiac Pacemakers. doi: http://osrp.lanl.gov/pacemakers.shtml.
Huffman FN, Norman JC (1974) Nuclear-fueled cardiac pacemakers. Chest 65:667-672.
Howe SD, Crawford D, Navarro J, Ring T (2013) Economical Production of Pu-238: Feasibility Study. Center for Space Nuclear Research. pp. 1-25.
Nassan L, Yassine T, Achkar B (2011) Production of Ho-166 and Sm-153 using hot atom reactions in neutron irradiated Tris(cyclopentadienyl) compounds. Nukleonika 56:263-267.
Szilard L, Chalmers TA (1934) Chemical separation of the radioactive element from its bombarded isotope in the Fermi effect. Nature 134:462.
Zeisler SK, et al (1998) Szilard-Chalmers effect in holmium complexes. 227: 0-4.
Zeisler SK, Becker DW, Weber K (1999) Szilard-Chalmers reaction in praseodymium compoundcompounds. J Radioanal Nucl Chem. 637-641.
Zhernosekov KP, Filosofov D V., Rosch F (2012) The Szilard-Chalmers effect in macrocyclic ligands to increase the specific activity of reactor-produced radiolanthanides: Experiments and explanations. Radiochim Acta 100:669-674.
Jia and Ehrhardt (1997) Enhancing the Specific Activity of 186Re Using an Inorganic Szilard-Chalmers Process. Radiochim Acta 79: 131-136.
Tomar BS, Steinebach OM, Terpstra BE, et al (2010) Studies on production of high specific activity 99Mo and 90Y by Szilard Chalmers reaction. Radiochim Acta. 499-506.
Mausner LF, Mirzadeh S, Srivastava SC (1992) Improved specific activity of reactor produced 117mSn with the Szilard-Chalmers process. Int J Radiat Appl Instrumentation Part A 43:9, 1117-1122.
Hetherington EL, Sorby PJ, Camakaris J (1986) The preparation of high specific activity copper-64 for medical diagnosis. Int J Rad Appl Instrum A. 37:12, 1242-3.
Tehrani and Miller, Production of high specific activity radiolanthanides for medical purposes using the UC Irvine TRIGA reactor, J Radioanal Nucl Chem (2015) 303:1099-1103.
Neves M, Kling A, Lambrecht RM (2002) Radionuclide production for therapeutic radiopharmeceuticals. Appl Radiat Isot 57: 657-664.
Nayak D, Lahiri S (1999) Application of radioisotopes in the field of nuclear medicine—I. Lanthanide series elements. J Radioanal Nucl Chem 242:423-432.
Cutler CS, Smith CJ, Ehrhardt GJ, Tyler TT, Jurisson SS, Deutsch E (2000) Current and potential therapeutic uses of lanthanide radioisotopes. Cancer Biother Radio 15:531-545.
Horwitz EP, McAlister DR, Bond AH, Barrans RE, Williamson JM (2005) A process for the separation of Lu-177 from neutron irradiated Yb-176 targets. Appl Radiat Isot 63:23-36.
Dadachova E, Mirzadeh S, Lambrecht RM, Hetherington EL, Knapp FF (1994) Separation of carrier-free Ho-166 from neutron-irradiated dysprosium targets. Anal Chem 66: 4272-4277.
Bakht MK, Sadeghi M (2011) Internal radiotherapy techniques using radiolanthanide praseodymium-142: a review of production routes, brachytherapy, unsealed source therapy. Ann Nucl Med 25:529-535.
Uusijarvi H, Bernhardt P, Rosch F, Maecke HR, Forssell-Aronsson E (2006) Electron- and positron-emitting radiolanthanides for therapy: aspects of dosimetry and production. J Nucl Med 47:807-814.
International Atomic Energy Agency, Nuclear Data Services. Database for Prompt Gamma Ray Neutron Activation Analysis. PGAA Database Files-PGAA Prompt Gamma Data. Available: https://www-nds-iaea.org/pgaa/. Accessed Sep. 24, 2018. pp. 1-2.

* cited by examiner

HIGH EFFICIENCY CONTINUOUS-FLOW PRODUCTION OF RADIOISOTOPES

CROSS-REFERENCE TO RELATED APPLICATIONS

This application claims priority to, and the benefit of, co-pending U.S. provisional application entitled "HIGH EFFICIENCY CONTINUOUS-FLOW PRODUCTION OF RADIOISOTOPES" having Ser. No. 62/338,162, filed May 18, 2016, the contents of which are incorporated by reference in their entirety.

STATEMENT REGARDING FEDERALLY SPONSORED RESEARCH OR DEVELOPMENT

This invention was made with government support under award NRC-HQ-11-G-38-0037 awarded by the Nuclear Regulatory Commission and award DE-NE-0000361 awarded by the Department of Energy. The government has certain rights in the invention.

TECHNICAL FIELD

The present disclosure generally relates to methods of making radioisotopes and radioisotopes produced therefrom.

BACKGROUND

Radionuclides used for medical applications must exhibit certain properties. Ideally the radionuclides should be obtained in a carrier free form with high specific activity, so a minimum amount can be administrated with maximum effect. This prevents chemical toxicity effects and overexposure of healthy tissues and organ. The radionuclide must have a relatively short half-life so that after serving its desired purpose it will decay and not cause excess damage to the surrounding organs and tissues. The radioisotope of interest should be obtained in a form so it can easily chelate to site-specific ligands that can facilitate its incorporation into radiopharmaceuticals. For diagnostic purposes the radioisotope must have an image-able gamma ray. For therapeutic applications the radionuclide should have beta or alpha emissions with energy levels suitable for delivering a therapeutic dose to the target tissue. Several of the lanthanide elements have suitable characteristics for use as medical radionuclides. In addition to their desirable nuclear properties they also have some beneficial chemical properties. In solution, the lanthanide elements predominantly exist in the +3 valence state and all exhibit similar chemical characteristics. This enables the application of the same synthesis route and procedure for the synthesis of different lanthanide compounds. A major challenge encountered in reactor produced radioisotopes for medical application is achieving high specific activity. If production of the nuclide is by a (n, γ) reaction, achieving high specific activity may require long irradiation times, sometimes not feasible for short-lived medical isotopes, or separation of isotopes with only ~1 amu difference in atomic mass, which, for lanthanides, is an energy intensive and overall challenging task.

Radioisotopes are produced via nuclear reactors or particle accelerators. When produced using nuclear reactors via the direct (n,gamma) method, often high specific activity radioisotopes with minimum carrier (stable isotope) cannot be obtained, due to the fact that the target isotope and the produced radioisotope are the same element and conventional separation techniques cannot easily be applied to separate the product radioisotope from the target

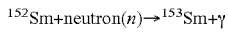
$^{152}Sm+neutron(n) \rightarrow ^{153}Sm+\gamma$

High specific activity can be achieved in reactor produced radioisotopes with high neutron fluxes and long irradiation times but the product will always contain a considerable amount of stable isotope carrier. One primary application of radioisotopes is in the medical field, were they are used for diagnostic purposes such as medical imaging and therapeutic applications such as cancer treatment. One major requirement for the applicability of radionuclides in medicine strongly relies on achievable specific activity. The radionuclides should be obtained with high specific activity so a minimal concentration can be administered with maximum effect, to prevent chemical toxicity complications.

Prior studies have been performed on high specific activity radioisotope production via the Szilard-Chalmers method. Those studies take advantage of radioisotope separation and processing post irradiation. There are some major drawbacks associated with post irradiation separation and processing such as, retention of the recoiled and separated radioisotopes due to recombination or isotope exchange with the original target, further neutron capture of the product radioisotope, resulting in the formation of undesired radioisotope by-products and the need for exotic and costly hot cell facilities for post irradiation processing.

There remains a need for improved methods of producing high specific activity radioisotopes that overcome the aforementioned deficiencies.

SUMMARY

Other systems, methods, features, and advantages of the high specific activity radioisotopes and methods of producing high specific activity radioisotopes will be or become apparent to one with skill in the art upon examination of the following drawings and detailed description. It is intended that all such additional systems, methods, features, and advantages be included within this description, be within the scope of the present disclosure, and be protected by the accompanying claims.

The proposed technology can be used for producing high specific activity radioisotopes using an innovative experimental setup, for fields such as but not limited to: medical, radiopharmaceuticals, industrial applications, radioisotope power systems for space exploration and scientific research. The methods can take advantage of the recoil characteristics of atoms upon neutron capture to separate a radioisotope product with increased specific activity. The methods can address the challenges of obtaining reactor-produced radioisotopes with high specific activity by: taking advantage of the recoil characteristics of an atom upon neutron capture and using an innovative experimental setup. The produced radioisotopes are ideal for nuclear medicine applications among many other applications.

The objective of the disclosure is to introduce methods of producing radioisotopes with high specific activity in a nuclear reactor using the Szilard-Chalmers method. The Szilard-Chalmers effect occurs upon neutron capture and emission of prompt gamma rays, imparting recoil energy to the product radioisotope and ejecting the radioisotope in the opposite direction. Upon the presence of an immiscible capture matrix in contact with the target during irradiation, the recoiling radionuclide can be captured and separated from the bulk of the inactive material leading to a radioisotope product with increased specific activity compared to direct neutron activation method typically used. We propose an innovative experimental setup to instantaneously separate the radioactive recoil product formed during irradiation from the bulk of non-radioactive ions. The instant separation prevents the recoiled radioactive nucleus from reforming its original bonds with the target matrix and chemically separates it from the non-radioactive target matrix, resulting in a low carrier radioisotope product with increased specific activity. In addition an irradiation target was developed, by coating porous Styrene divinylbenzene XAD-4 resins with a polyvinyl alcohol lanthanide mixture. Irradiation of the synthesized resins resulted in enrichment factors up to 2 times higher compared to the lanthanide powder targets initially used.

The proposed methods are useful particularly for nuclear medicine applications, such as diagnostic purposes such as medical imaging and therapeutic applications such as cancer treatment. For medical applications the radioisotope should ideally be in a carrier free form with high specific activity, which is a challenge encountered in radioisotope production via nuclear reactors. The Szilard-Chalmers method coupled with the experimental setups described herein can address the mentioned challenges. Additionally the methods can be used for the production of radioisotopes such as $^{238}$Pu, which is used by NASA to power deep space missions. The proposed method addresses the major challenge current $^{238}$Pu production methods face.

In various aspects, methods of producing radionuclides with high specific activity are provided. The methods can include causing a liquid capture matrix to flow in contact with a target comprising a target nuclide; irradiating the target with ionizing radiation or particles to produce the radionuclides that are ejected from the target and into the capture matrix in contact with the target; and causing the liquid capture matrix containing the radionuclides to flow from the target to recover the capture matrix comprising the radionuclides with high specific activity.

The methods can include producing a variety of radionuclides from a variety of target nuclides and from a variety of reactions. In various aspects, the radionuclides are produced from the target nuclide via a reaction selected from the group consisting of a (n, γ) reaction, a (γ, n) reaction, a (n, 2n) reaction, a (n,p) reaction, a (n,α) and a (n,fission) reaction. The reactions can be initiated by applying radiation selected from the group consisting of neutron radiation, gamma radiation, and a combination thereof. In various aspects, the radiation is thermal neutron radiation, epithermal radiation, or a neutron radiation having a neutron energy above 0.4 eV. For example, the radiation can include Cadmium neutrons, EpiCadmium neutrons, slow neutrons, resonance neutrons, intermediate neutrons, or fast neutrons.

The target nuclides can be any target nuclide suitable for the reactions described, e.g. having a suitable capture cross section for the specific reaction that produces the radionuclides. The target nuclide can be selected from the group consisting of elements having atomic number from 21 to 102. In various aspects, the target nuclide is a lanthanide or an actinide. In some aspects, the target nuclide is $^{23}$Na, $^{31}$P, $^{37}$Cl, $^{50}$Cr, $^{55}$Mn, $^{75}$As, $^{81}$Br, $^{89}$Y, $^{98}$Mo, $^{104}$Ru, $^{127}$I, $^{152}$Sm, $^{185}$Ho, $^{174}$Yb, $^{175/176}$Lu, $^{185}$Re, $^{187}$Re, $^{194}$Pt, $^{197}$Au or $^{237}$Np.

The target nuclides can have a variety of organic ligands attached thereto. The radionuclides can be ejected from the target by breaking one or more bonds with the ligands. The ligands can be small molecules having one or more donor atoms selected from the group consisting of oxygen, nitrogen, and a combination thereof. In various aspects, the ligands are acetylacetonate, picolinate, 8-hydroxyquinolinate, dimethylglyoximate, oxalate, 4-aminobenzoate, glycinate, or derivatives thereof.

In various aspects, the target contains a support structure having a large surface area, wherein the target nuclide is in a thin coating on the support structure. This type of target structure can provide for larger enrichment factors as compared to a powder target. Suitable support structures can include mesoporous resin materials, e.g. having a surface area of about 500 m$^2$/g to about 1000 m$^2$/g. In various aspects, the support structure is a copolymer of styrene and divinylbenzene. In one or more aspects, the thin coating on the support structure has a thickness that is less than the recoil range of the target nuclide.

In various aspects, the target is largely insoluble in the liquid capture matrix. The liquid capture matrix can be, for instance, water or other polar liquid. In various aspects, the liquid capture matrix has a pH of about 3 to 5.

The methods can produce radionuclides with large enrichment factors, e.g. enrichment factors of about 3 to 30. A variety of radionuclides with high specific activity are produced by the methods described herein. In some aspects, the method includes wherein the target nuclide is $^{237}$Np, and wherein the radionuclide is $^{238}$Np that decays to produce $^{238}$Pu. In some aspects, the method includes wherein the target nuclide is $^{98}$Mo, and wherein the radionuclide is $^{99}$Mo that decays to produce $^{99m}$Tc.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1:
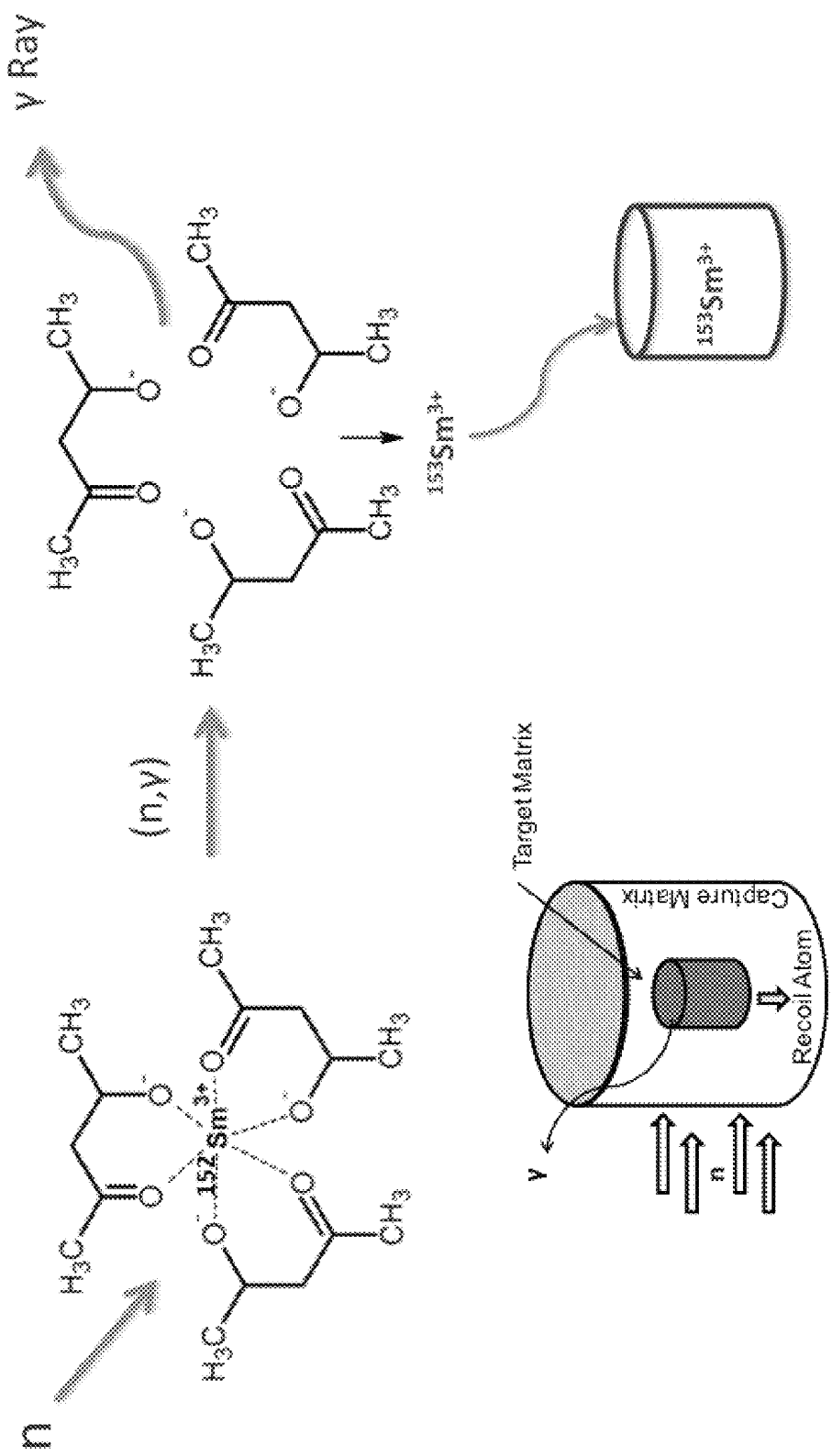
FIG. 1 is a schematic of an exemplary Szilard-Chalmers effect for the production of $^{153}$Sm from a $^{152}$Sm target as a result of prompt gamma recoil.

In various aspects, methods of producing high specific activity radionuclides are provided. Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure.

Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of radiochemistry, nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "thermal neutron," as used herein, refers to a free neutron that is in thermal equilibrium with its surroundings or is essentially in thermal equilibrium with its surroundings. A thermal neutron is said to be in equilibrium with its surroundings when, for a given temperature, the neutron is travelling at the most probable velocity for a Maxwell-Boltzmann distribution of neutrons at this temperature. The most probable velocity at a given temperature ($v_T$) for a Maxwell-Boltzmann distribution of neutrons can be given by the formula $$v_T = \sqrt{\frac{2kT}{m}}$$

where k is the Boltzmann's constant; T is the temperature, and m is the neutron mass. The thermal neutron can have a velocity of about 2100 m s$^{-1}$ to 2500 m s$^{-1}$, about 2120 m s$^{-1}$ to 2480 m s$^{-1}$, about 2140 m s$^{-1}$ to 2260 m s$^{-1}$, or about 2200 m s$^{-1}$. A neutron is said to be essentially in thermal equilibrium with its surroundings when, for a given temperature, it has a velocity within ±10%, ±5%, or ±1% of the most probable velocity for a Maxwell-Boltzmann distribution of neutrons at this temperature.

Methods of Producing Radionuclides

Various methods of producing radionuclides are provided. In one or more aspects, the methods include producing radionuclides with high specific activity in nuclear reactors using the Szilard-Chalmers method (FIG. 1). The Szilard-Chalmers method works such that upon neutron capture of the target isotope ($^{152}$Sm) there is an increase in energy due to the binding energy of that neutron, this excess energy is released in the form of prompt gamma rays which imparts a certain amount of recoil energy to the capturing nucleus. This recoil energy is often enough to break the chemical bonds holding the radionucleus ($^{153}$Sm) in the target compound, and eject it in the opposite direction. The recoiling radionucleus is usually in a different chemical form than the target so if there is an immiscible capture matrix in contact with the target that can capture and separate the recoiling radionucleus from the bulk of the inactive material, the radioisotopes can be obtained with high specific activity Depending on the mass of the target radionuclide and the energy of the prompt gamma ray, the recoil energy is often enough to break the chemical bonds holding the capturing radionuclide in the compound and eject it in the opposite direction. The recoil energy of the capturing radionuclide by the (n, γ) reaction is calculated according to the following equation:

$$E_R = \frac{E_\gamma^2}{2 \times m_A \times c^2} \approx \frac{E_\gamma^2}{2 \times A \times 931.5}$$

where $E_R$ is the recoil energy in MeV, $m_A$ is the mass of the radiating atom, c is the speed of light, A is the atomic number of the recoiling atom, $E_\gamma$ is the energy of the prompt gamma ray in MeV and 931.5 MeV/u is the conversion factor from atomic mass scale to energy. It can be seen that isotopes with small mass numbers (A) and large prompt gamma energies ($E_\gamma$) result in larger recoil energy ($E_R$) values. The larger the recoil energy the higher the probability of the radioisotope being ejected away from the target matrix and separated as a pure radioisotope product with high specific activity. The radionuclide can be produced from the target nuclide via a reaction such as a (n, γ) reaction, a (γ, n) reaction, a (n, 2n) reaction, a (n, p) reaction, a (n, α) reaction, or a (n, fission) reaction.

In various aspects, the methods include using a liquid capture matrix that can be easily separated from the target to produce the radionuclides with high specific activity. The liquid capture matrix can be water or other polar liquid. The pH of the liquid capture matrix can be adjusted, for example to optimize the specific activity of the radionuclide in the capture matrix. In various aspects, the pH of the liquid capture matrix is about 2 to 12, about 3 to 10, about 3 to 8, about 3 to 7, about 3 to 5, about 2 to 3, about 3 to 4, about 4 to 5, about 5 to 6, about 6 to 7, about 7 to 8, about 8 to 9, or about 9 to 10. The liquid capture matrix can be easily separated from the target. For example, the target can be contained inside a compartment such as a mobile-phase filter compartment through which the liquid capture matrix can flow. The method can include causing a liquid capture matrix to flow in contact with a target containing a target nuclide. The methods can include using a pump or other system to flow a liquid capture matrix through, over, or around the target so as to contact the target. The flow can be a continuous flow. The flow rate can be adjusted to optimize the specific activity of the radionuclide in the capture matrix. The target can be insoluble or essentially insoluble in the capture matrix, e.g. having a solubility about 0.05 M, about 0.01 M, about 0.005 M, about 0.004 M, about 0.003 M, about 0.002 M, about 0.001 M, or less.

The methods can include irradiating the target with ionizing radiation or particles to produce the radionuclides that are ejected from the target and into the capture matrix in contact with the target. The radiation can include neutron radiation, gamma radiation, or a combination thereof. The radiation can be thermal neutron radiation. The radionuclides can be produced via a Szilard-Chalmers reaction and ejected into the liquid capture matrix. The methods can then include causing the liquid capture matrix containing the radionuclides to flow from the target to recover the capture matrix containing the radionuclides with high specific activity. In various aspects, the recovered radionuclides can be carrier free or essentially carrier free, e.g. having a specific activity of about 1 millicurie/microgram (mCi/μg) to 20 mCi/μg, about 1 mCi/μg to 10 mCi/μg, about 5 mCi/μg to 10 mCi/μg, about 5 mCi/μg to 15 mCi/μg, about 8 mCi/μg to 20 mCi/μg, or about 10 mCi/μg to 20 mCi/μg, about 0.0001 mCi/μg to 1 mCi/μg.

The methods can be applied to a variety of targets and target nuclides. The target nuclide can be a nuclide having a cross section for neutron capture and prompt y emission or, for other types of radiation, the target nuclide can be any element that has a cross section for the radiation. In some embodiments, the target nuclide can be any element having atomic number from 11-102, 11-20, 57-71, 89-102 and 21-102. In one or more aspects, the target nuclide is selected from the group of $^{23}$Na, $^{31}$P, $^{37}$Cl, $^{50}$Cr, $^{55}$Mn, $^{75}$As, $^{81}$Br, $^{89}$Y, $^{98}$Mo, $^{104}$Ru, $^{127}$I, $^{152}$Sm, $^{165}$Ho, $^{174}$Yb, $^{175/176}$Lu, $^{185}$Re, $^{187}$Re, $^{194}$Pt, $^{197}$Au, and $^{237}$Np. In various aspects, the target nuclide is a lanthanide or an actinide. In some aspects, the target nuclide is $^{237}$Np, and the radionuclide is $^{238}$Np that decays to produce $^{238}$Pu. In some aspects, the target nuclide is $^{98}$Mo, and the radionuclide is $^{99}$Mo that decays to produce $^{99m}$Tc. In some aspects, the target nuclide has one or more organic or inorganic ligands attached thereto, and the radionuclides are ejected from the target by breaking one or more bonds with the ligands. The ligands can be a ligand that forms a stable complex with the target nuclide. The organic ligand can be a small molecule having one or more donor atoms such as oxygen and/or nitrogen. The organic ligands can include acetylacetonate, picolinate, 8-hydroxyquinolinate, dimethylglyoximate, oxalate, 4-aminobenzoate, glycinate, or a derivative thereof.

For example, the experimental setup can include a mobile phase filter (VICI) compartment containing the irradiation target, where it's housed in a PEEK material container. The PEEK container has an inlet port that connects the filter compartment directly to a continuous fluid pump, which continuously pumps the capture matrix through the target were its then filtered out into the PEEK container. The container has a separate outlet port that terminates in a collection reservoir and allows sample collection. The PEEK container system was used in Example 3 for both pre-irradiation solubility test and recoil/irradiation studies in addition to post irradiation monitoring of the solid/capture matrix system. For irradiation purposes the exemplary setup includes a hollow aluminum tube, also known as the flow loop terminus (FLT) that terminates in the outer ring position of the UC-Irvine TRIGA® reactor core.

Figure 2:
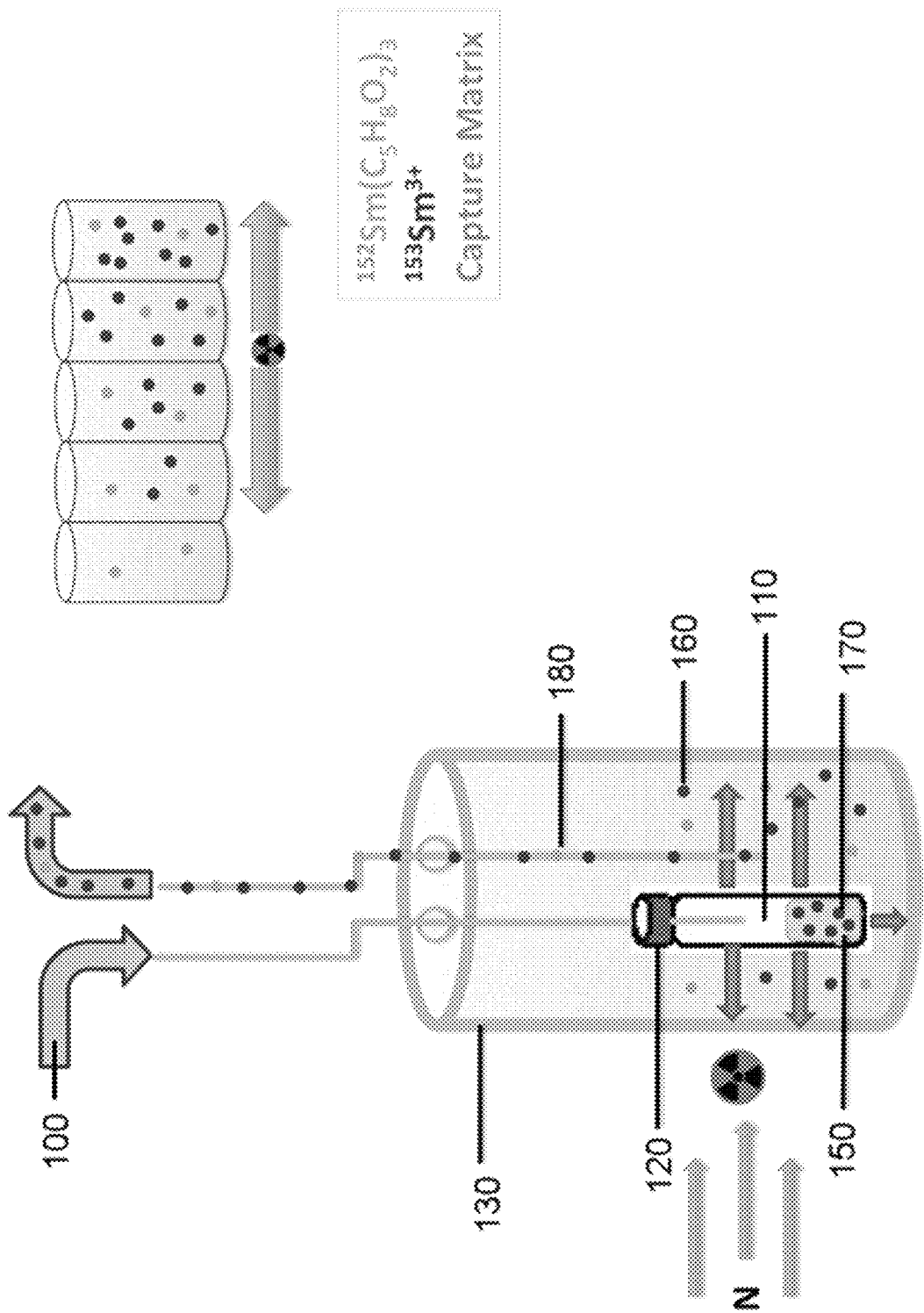
FIG. 2 is a schematic of one embodiment of how radioisotopes with high specific activity can be produced via continuous-flow Szilard-Chalmers reaction.

FIG. 2 depicts a schematic of an exemplary embodiment of how radioisotopes with high specific activity can be produced via continuous-flow Szilard-Chalmers method using Samarium Acetylacetonate (Sm(C$_5$H$_8$O$_2$)$_3$) as a representative irradiation target. The samarium irradiation target 150 is housed in the compartment 110 of a mobile phase filter unit 120, contained in the reaction vessel 130. During irradiation the capture matrix 100 flows through the irradiation target 150, separating any recoiled radioisotopes 160 from the irradiation target isotope 170. The radioisotope rich capture matrix 180 is accumulated in the reaction vessel 130 and continuously pumped out and collected during the irradiation process. In some aspects, during this process the target isotope 170 has little to no solubility in the capture matrix 100 and maximum transfer of the radioisotope 160 to the capture matrix allows 100 for improved separation.

During irradiation the irradiation target 150 can be continuously contacted with fresh capture matrix 100, post contact the capture matrix 100 containing the recoiled ionic radionuclide 160 can be collected in sample vials surrounded by shielding. The setup can allow instantaneous separation of the capture matrix containing the recoiled nucleus 180 from the bulk of the inactive material during irradiation. The rapid separation of the recoiled nucleus 160 can prevent the radioisotope from reforming its original bonds with the target matrix and in turn prevents retention of the radionuclide 160 in the irradiation target 150 (FIG. 2).

In various aspects the steps of the procedure can be modified to increase the specific activity of the radionuclide and/or to increase the enrichment factor. The enrichment factors can be determined by the equation $$\text{Enrichment Factor } (EF) = \frac{X^+(\text{capture matrix})}{X(\text{capture matrix})} \Big/ \frac{X^+(\text{target})}{X(\text{target})}$$

where X$^+$(capture matrix) and X$^+$(target) are the concentration of the radionuclide in the capture matrix and target, respectively, and where X (capture matrix) and X (target) are the concentrations of the target nuclide in the capture matrix and target, respectively. In various aspects, the enrichment factor can be about 2 to 100, about 3 to 50, about 3 to 30, about 5 to 30, about 10 to 30, about 15 to 30, about 15 to 25, about 10 to 20, about 20 to 30, about 30 to 40, or about 40 to 50. In various aspects, the specific activity of the radionuclide in the capture matrix is about 10 mCi/μg, 20 mCi/μg, 30 mCi/μg, 40 mCi/μg, 50 mCi/μg, or more.

A variety of targets including the target nuclide can be used with methods described herein. The target can include the target nuclide and a polymer matrix supporting the target nuclide. The polymer matrix can include a variety of polymers. The polymers can include water soluble polymers such as polyvinyl alcohol or cellulose ethers. The polymers can be in the form of thin sheets or films incorporating the target nuclide. The polymers can be in the form of polymeric microparticles incorporating the target nuclide. In some aspects, the target included a support structure having a large surface area, e.g. a surface area of about 500 $m^2/g$ to 1500 $m^2/g$, about 500 $m^2/g$ to 1200 $m^2/g$, about 600 $m^2/g$ to 1200 $m^2/g$, about 600 $m^2/g$ to 800 $m^2/g$, about 700 $m^2/g$ to 900 $m^2/g$, about 800 $m^2/g$ to 1000 $m^2/g$, or about 900 $m^2/g$ to 1100 $m^2/g$. The target nuclide can be in a thin layer on the surface or the outside of the support structure so as to increase the contact area with the capture matrix. The support structure can be a microporous or a mesoporous resin. The support structure can be a hydrophobic resin. In some aspects, the support structure is a copolymer of styrene and divinylbenzene. The polymer incorporating the target nuclide can be in a coating on the surface of the support structure. The coating of the target nuclide on the support structure can have a variety of thicknesses. In some aspects, the thickness is less than the recoil range of the target nuclide when exposed to the radiation, ionizing radiation, particles, or a combination thereof.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Production of Radiolanthanides Via Szilard-Chalmers Effect

Synthesis of Lanthanide Complexes

A number of well-defined temperature and air stable lanthanide complexes with ligands containing oxygen or nitrogen donor atoms were synthesized according to previous literature methods with slight modifications (Zeisler S K, Weber K; J Radioanal. Nucl. Chem., 227:105-109 (1998); Tomar B S, et al.; *Radiochim Acta* 98:499-506 (2010)). The following general synthesis procedure was adapted for the synthesis of samarium acetylacetonate, samarium oxalate, samarium 4-aminobenzoate, holmium oxalate, and holmium 4-aminobenzoate.

5 mmol of the lanthanide nitrate (Ho, 99.9%, Strem chemicals; Sm, 99.9%, Acros Organics) was dissolved in enough boiling 0.01 M HCl (36.5-38%, EMD chemicals) to dissolve the lanthanide nitrate salt. The solution was evaporated to remove any unreacted acid. The resulting residue was dissolved in 20 mL of ultrapure water (>18.2 MO) and removed from heat. A five-fold excess of the ligand was added to the solution under constant stirring (2,4-pentadione, i.e. acetylacetone, 99% Acros Organics; 4-aminobenzoate, 99% Sigma Aldrich, oxalic acid, 99.9% Fisher Scientific). The pH of the mixture was adjusted to 5.5-6 by drop-wise addition of 14.5 M ammonia (Ammonium hydroxide 29.14% Fisher Scientific). The precipitate was separated from the solution by vacuum filtration and dried in an oven at 75° C. for 45 min.

Samarium 8-hydroxyquinolinate and holmium 8-hydroxyquinolinate were synthesized according to the following general procedure: 1 mmol of the lanthanide nitrate was dissolved in 50 mL of ethanol (95%, Gold Shield Chemicals). 4 mmol of 8-hydroxyquinolinate (99%, Sigma Aldrich) was gradually dissolved in 50 mL of ethanol. The 8-hydroxyquinolinate ethanolic solution was added to the lanthanide solution under constant stirring. The mixture was heated to boiling for 35 min. Precipitate formation was instantaneously visible. After 35 min the mixture was removed from heating, stirring continued until the mixture was at room temperature. The precipitate was separated from the mixture by vacuum filtration and dried in the oven at 75° C. for 45 min.

Pre-Irradiation Solubility Tests

The solubility of the lanthanide complexes in the water capture matrix was determined by mixing a few milligrams of the lanthanide-containing target solid thoroughly with 0.5 mL of ultra-pure $H_2O$ then separating the solution from the solid utilizing centrifugal filter tubes (EMD Millipore). A second wash of the solid was obtained using the same procedure. The solid and the washes were submitted for neutron activation analysis in order to determine the solubility of the lanthanide containing target in $H_2O$.

Recoil and Irradiation

In order to determine the recoil characteristics of the activated lanthanide nucleus from the bulk of the inactive material and investigate the Szilard-Chalmers reaction, a few milligrams of the lanthanide-containing target was mixed with 0.5 mL of $H_2O$ on the filter of the centrifugal filter tubes. The solid (target matrix) was irradiated in contact with the water (capture matrix). The samples were irradiated at the University of California Irvine TRIGA reactor with a neutron flux of $8 \times 10^{10}$ n $cm^{-2}$ $s^{-1}$ for 20 min.

Post Irradiation Sample Handling

Post irradiation, the samples were left to cool for a predetermined amount of time to allow any short-lived radioisotopes to decay, before being transferred to the laboratory for treatment and analysis. The capture matrix was filtered and separated from the solid in order to separate any recoiled radiolanthanide. The solid residue and capture matrix were collected for analysis of the activity of the radiolanthanide. The pre-irradiation solubility test washes along with standards were also prepared for analysis. The samples were analyzed for radiolanthanide activity using a High Purity Germanium detector (HPGe) at the representative gamma energy of the radiolanthanide of interest. The $^{153}$Sm activity of the samarium samples were measured at the gamma energy of $E_\gamma=103$ keV and $^{166}$Ho in the holmium samples were measured at $E_\gamma=81$ keV.

Solubility and Recoil of the Lanthanide Complexes

The percent activity of the nuclide of interest in the different samples (wash, target, capture matrix) is shown in Table 1 for compounds (1)-(7). All the samples for a particular compound were irradiated as a group, along with standards for calibration purposes and direct comparisons of activities. In samples that were not treated post irradiation by separation (e.g. as in the case of target and capture matrix) the activity of the radiolanthanide is directly related to the total concentration of the corresponding lanthanide. The count rate measured in each sample was normalized to a single point in time to account for decay during measurements. Both pre-irradiation washes were collected to give an indication of the solubility of the lanthanide complex in the capture matrix ($H_2O$). The second wash was obtained to determine if the lanthanide activity detected in the first wash was actually due to solubility of the lanthanide containing target or due to factors such as impurities or the presence of uncomplexed lanthanide that came off in the first wash. The percent activity of the radiolanthanide retained in the solid compound was indicative of the amount of the produced radiolanthanide that did not recoil into the capture matrix and was retained in the target. Radiolanthanides that recoiled out but reformed bonds with the solid compound would appear as retained as well. The percent activity in the capture matrix indicates the amount of radioisotopes transferred to the capture matrix during irradiation that did not reform bonds with the target matrix. Activity in the capture matrix may also reflect dissolution of the target matrix rather than recoil.

TABLE 1

Extraction yield and retention of the studied radiolanthanides

| Compound | % Activity in wash 1 | % Activity in wash 2 | % Activity in target | % Activity in capture matrix |
| --- | --- | --- | --- | --- |
| (1) Samarium acetylacetonate | 7.0 ± 2.3 | 2.1 ± 1.3 | 46.2 ± 7.6 | 44.7 ± 6.9 |
| (2) Samarium 4-aminobenzoate | 27.3 ± 3.0 | 26.8 ± 2.9 | 23.0 ± 2.7 | 22.9 ± 2.6 |
| (3) Samarium oxalate | <1 | <1 | 98.7 ± 5.4 | 1.2 ± 0.3 |
| (4) Samarium 8-hydroxyquinolinate | <1 | <1 | 90.4 ± 9.5 | 9.2 ± 2.2 |
| (5) Holmium 8-hydroxyquinolinate | 1.4 ± 0.9 | <1 | 93.7 ± 9.5 | 4.4 ± 1.5 |
| (6) Holmium 4-aminobenzoate | 7.0 ± 1.6 | 7.7 ± 1.7 | 71.0 ± 6.5 | 14.3 ± 2.3 |
| (7) Holmium oxalate | <1 | <1 | 99.7 ± 3.8 | <1 |

Samarium acetylacetonate (1) in Table 1 shows slight indication of solubility, which decreases with the second wash. The $^{153}$Sm activity detected in the capture matrix indicates the possibility of the Szilard-Chalmers effect and recoil of the target radioisotope into the capture matrix. Samarium 4-aminobenzoate (2) was soluble in water as was holmium 4-aminobenzoate (6) with both washes indicating the same amount of solubility; therefore these compounds were not good candidates under the proposed experimental conditions. The samarium (3) and holmium oxalate (7) compounds were found to be insoluble in water with minimal activity detected in both pre-irradiation washes. The majority of activity remained retained in the solid target. The activity detected in the capture matrix was enough to consider samarium or holmium oxalate as potential candidates for further studies of the Szilard-Chalmers reaction with different experimental environments to enhance the recoil effect. The low yield in the capture matrix indicates that the oxalate compounds had either high stability, such that the recoil energy was not capable to overcome the binding energy holding the compound together or that the compounds had fast kinetics such that as soon as the target radioisotope recoiled away from its original position it instantly reformed its original bonds in the target matrix. The solubility of samarium 8-hydroxyquinolinate (4) in water was low and the retention of the $^{153}$Sm in the target was large. The $^{153}$Sm activity detected in the capture matrix may be attributed to both solubility and the Szilard-Chalmers effect. Holmium 8-hydroxyquinolinate (5) showed low solubility in the first wash and decreasing solubility in the second wash, with the majority of the activity retained in the target. The $^{166}$Ho activity detected in the capture matrix indicates the possibility of recoil of $^{166}$Ho from the target into the capture matrix. Between the Sm and Ho compounds tested, samarium acetylacetonate (1) and holmium 8-hydroxyquinolinate (5) showed the highest indication of the Szilard-Chalmers effect. Hence, these compounds were chosen for enrichment factor determination.

Determination of Enrichment Factors

The irradiated holmium 8-hydroxyquinolinate and samarium acetylacetonate samples were allowed to decay to near background levels, and then re-irradiated at the same flux and irradiation time as the first irradiation for the purpose of determining the enrichment factors. No post-treatment of the samples were made, as the aim was to determine the amount of $^{152}$Sm or $^{165}$Ho in the samples, respectively. Thus, the activity found after the second irradiation would reflect the amount of non-radioactive (target) lanthanide isotopes found in the capture matrix. If the re-irradiation produces the same number of radioisotopes in the capture matrix as the first irradiation, i.e. $_Z^{A+1}X$(1st irradiation)=$_Z^{A+1}X$(2nd irradiation), then there was no isotope enrichment and the activity from the first irradiation was from the dissolution and/or degradation of the target matrix. The assumption is that the target isotope ($^{152}$Sm or $^{165}$Ho) was not consumed to any significant degree during the irradiation. On the other hand if $_Z^{A+1}X$(1st irradiation)>$_Z^{A+1}X$(2nd irradiation) radioisotope enrichment has occurred. In this case the radioisotopes in the capture matrix from the first irradiation are due to the Szilard-Chalmers reaction and not activation of cold atoms present in the capture matrix due to either solubility or degradation of the target in the capture matrix. The following equation was used to determine the enrichment factor such that if the ratio of produced radioisotope $_Z^{A+1}X$ to the number of the inactivated target isotope $_Z^A X$ in the capture matrix was greater than the number of radioisotopes produced $_Z^{A+1}X$ to the number of inactive target isotopes $_Z^A X$ in the target $$\left( \text{i.e.} \ \frac{_Z^{A+1}X(\text{capture matrix})}{_Z^A X(\text{capture matrix})} > \frac{_Z^{A+1}X(\text{target})}{_Z^A X(\text{target})} \right)$$

enrichment of the radioisotope has occurred by the Szilard-Chalmers Reaction.

$$\text{Enrichment Factor} \ (EF) = \frac{_Z^{A+1}X(\text{capture matrix})}{_Z^A X(\text{capture matrix})} \bigg/ \frac{_Z^{A+1}X(\text{target})}{_Z^A X(\text{target})}$$

An EF>1 indicates that the ratio of $_Z^{A+1}X/_Z^AX$ was higher in the capture matrix than in the target matrix, therefore the specific activity was enhanced and there was indication of radioisotope enrichment.

The enrichment factors for samarium acetylacetonate and holmium 8-hydroxyquinolinate were found to be 1.19 and 1.51, respectively. The enrichment factors obtained in our work were lower compared to previous studies done on lanthanide complexes using the Szilard-Chalmers method. Zeisler and Weber studied the Szilard-Chalmers effect in similar holmium complexes and were able to obtain enrichment factors between 3 and 66 (Zeisler S K, Weber K; *J Radioanal Nucl Chem*, 227:105-109 (1998)). A study done by Zhemosekov et al. on the Szilard-Chalmers effect in a Ho-DOTA complex resulted in enrichment factors between 7.3 and 90 (Zhemosekov, et al., *Radiochima Acta*, 100:669-674 (2012)). Nassan et al. obtained enrichment factors up to $10^7$ from neutron irradiated holmium-tris(cyclopentadienyl) compounds (Nassan et al., *Nukleonika*, 56:263-267 (2011)). However, in these previous works the enrichment factor was calculated differently, or no information was provided on how it was calculated. The low enrichment factor could be attributed to the following: (i) degradation of the target as a result of exposure to ionizing radiation during the irradiation, leading to breakdown of the target and release of the stable isotope into the capture matrix and hence lower enrichment factors; (ii) delay in separating the irradiated target from the capture matrix leading to the recoiled atom having time to reform its original bonds or possibly isotopic exchange with the stable isotope; (iii) insufficient recoil energy to break the bonds of the target molecule and release the radioisotope into the capture matrix. For example $^{153}Sm$ emits 160 prompt gamma rays upon neutron capture, resulting in recoil energies between 0.0028 and 121.7 eV. Electrostatic bond energies are on the order of a few electron volts. Thus in some cases the recoil energy is small compared to the bond energy of the target molecule and the radioisotope remains retained in the target; (iv) unfavorable location of the recoiling atom in the target; the recoil energy may be enough to eject the radioisotope but the radioisotope may not reach the capture matrix leading to further retention of the radiolanthanide in the target.

Example 2: Production of Molybdenum-99

Irradiation of ammonium molybdate phosphate solid powder for 15 min at a neutron flux of $8 \times 10^{11}$ n cm$^{-2}$ s$^{-1}$ yielded the following results (Table 2). Sample 1 is ammonium molybdate phosphate powder irradiated and contacted with water post irradiation for solubility and radioisotope recoil studies. The irradiated sample 1 was washed twice with water (wash 1 and wash 2) to determine separation of the recoiled Molybdenum-99 ($^{99}Mo$) and solubility of the Molybdenum compound in the water capture matrix. Wash 1, Wash 2, and the irradiated molybdenum target were all analyzed for $^{99}Mo$ activity using gamma spectroscopy at the prominent $^{99}Mo$ peak of 141 KeV.

In sample 2 ammonium molybdate phosphate was irradiated in contact with a water capture matrix. Post irradiation the capture matrix was separated from the irradiation target and washed an additional time to determine post irradiation solubility (wash 1). The irradiation target, capture matrix and wash 1 were analyzed via gamma spectroscopy under similar conditions to sample 1.

TABLE 2

Extraction yield and retention of radioactive Molybdenum-99

| Compound | % Activity in wash 1 | % Activity in wash 2 | % Activity in target | % Activity in capture matrix |
|---|---|---|---|---|
| Sample 1: Ammonium Molybdate Phosphate | <1 | <1 | 99.2 | N/A |
| Sample 2: Ammonium Molybdate Phosphate | 1.3 | N/A | 92.2 | 6.5 |

Sample 1 in Table 2 shows minimal indication of $^{99}Mo$ in both wash 1 and 2, with over 99% of the molybdenum retained in the target. The small fraction of $^{99}Mo$ in the washes indicates that the recoiled radioisotope was not efficiently separated, which can be due to isotopic exchange of the recoiled radioisotope and retention of the radioisotope in the target. Furthermore with respect to sample 1 it can be seen that the Molybdenum compound is minimally soluble in the capture matrix, with less than 1% $^{99}Mo$ activity detected in the capture matrix. In sample 2 the $^{99}Mo$ activity detected in the capture matrix in contact with the target during irradiation indicates the Szilard-Chalmers effect and recoil of the target radioisotope into the capture matrix. After the capture matrix was separated from the molybdenum target it was washed an additional time (wash 1), which indicates slight solubility of the molybdenum target with 1.3% of ($^{99}Mo$) transferred to wash 1. The higher percent $^{99}Mo$ transferred to the capture matrix in contact with the irradiation target during irradiation as opposed to contacting the target with capture matrix post irradiation, demonstrates the recoil and transfer of the radioisotope into an immiscible phase (capture matrix) preventing recombination or isotopic exchange with the original target and therefore yielding better results compared to sample 1.

Example 3: Production of High Specific Activity Radiolanthanides Via a Continuous-Flow Szilard-Chalmers Reaction A number of experiments were performed to look at the Szilard-Chalmers effect and recoil of the radioisotope using the exemplary continuous-flow experimental procedure described above and depicted in FIG. 2. For these experiments a number of lanthanide containing compounds were synthesized and used as is, in a solid powder form as the irradiation target. The criteria for choosing the capture matrix was such that the irradiation target had to be insoluble in the capture matrix to prevent dissolution of the stable isotope that would, as a result, lower the specific activity. The experiments were carried out using water as the capture matrix. Post irradiation the capture matrices collected and the original irradiation target were analyzed both for stable isotope and radioisotope content in order to determine enrichment factors.

Following the preliminary proof of concept experiments (example 1), the irradiation setup was enhanced in order to further optimize the enrichment factors and experimental conditions in addition to addressing some of the challenges encountered in the previous chapter, that lead to low enrichment factors. The proposed set up was such that the capture matrix flowed through the target continuously during irradiation and was then collected outside of the reactor core. The continuous flow instantaneously separated any radioisotope that had recoiled into the capture matrix, preventing potential, recombination, retention, isotopic exchange with the original target and successive neutron capture of the product radioisotope. Furthermore the setup was such that the irradiation target was placed in a filtering compartment, which allowed the capture matrix to filter out in all directions. Therefore the capture matrix was continuously contacted with the target material and filtered out through the bottom or sides of the filter unit, resulting in a higher concentration of separated radioisotopes (FIG. 3).

The equation below was used to determine the enrichment factor such that if the ratio of produced radioisotope $_Z^{A+1}X$ to the number of the inactivated target isotope $_Z^A X$ in the capture matrix was greater than the number of radioisotopes produced $_Z^{A+1}X$ to the number of inactive target isotopes $_Z^A X$ in the target $$\left( \text{i.e. } \frac{_Z^{A+1}X(\text{capture matrix})}{_Z^A X (\text{capture matrix})} > \frac{_Z^{A+1}X(\text{target})}{_Z^A X (\text{target})} \right)$$

enrichment of the radioisotope has occurred by the Szilard Chalmers Reaction.

$$\text{Enrichment Factor } (EF) = \frac{_Z^{A+1}X(\text{capture matrix})}{_Z^A X(\text{capture matrix})} \bigg/ \frac{_Z^{A+1}X(\text{target})}{_Z^A X(\text{target})}$$

An EF>1 indicates that the ratio of $_Z^{A+1}X/_Z^A X$ is higher in the capture matrix than in the target matrix, therefore the specific activity is enhanced and there is indication of radioisotope enrichment. The enrichment factors were calculated using the above equation. The maximum enrichment factors for the compounds tested are summarized in Table 3.

TABLE 3

Maximum Enrichment Factors for Lanthanide Compounds

| Target Compound | Radioisotope | Enrichment Factor |
| --- | --- | --- |
| Holmium 8-hydroxyquinolinate | $^{166}$Ho | 11.26 |
| Holmium acetylacetonate | $^{166}$Ho | 14.83 |
| Samarium 8-hydroxyquinolinate | $^{153}$Sm | 11.19 |
| Samarium acetylacetonate | $^{153}$Sm | 3.56 |

For example an enrichment factor of 11.19 for samarium 8-hydroxyquinolinate results in a 91.6% increase of the samarium-153 specific activity compared to just irradiating the target under the same conditions, without the Szilard-Chalmers continuous flow radioisotope production and separation process. The flow-loop system can be easily installed in any research reactor or radioisotope production facility and be used for radioisotope production using the Szilard-Chalmers method. The proof of concept experiments performed verifies that the Szilard-Chalmers method coupled with the unique flow loop setup results in a radioisotope product with higher specific activity compared to the typical neutron irradiation of a target.

Additional experiments were performed to examine the impact of the pH of the capture matrix, using a $10^{-4}$M HNO$_3$ capture matrix. The results for Holmium 8-Hydroxyquinolate and Samarium 8-hydroxyquinolate targets are presented in Table 4.

TABLE 4

Maximum Enrichment factors for lanthanide compounds with $10^{-4}$M HNO$_3$ capture matrix.

| Target Compound | Radioisotope | Enrichment Factor |
| --- | --- | --- |
| Holmium 8-Hydroxyquinolinate | $^{166}$Ho | 4.54 |
| Samarium 8-Hydroxyquinolinate | $^{153}$Sm | 1.37 |

Example 4: Production of High Specific Activity Radiolanthanides Via a Continuous-Flow Szilard-Chalmers Reaction with Large-Surface-Area Targets The lanthanide irradiation targets used for the initial experiments (mentioned above) were solid powders of samarium and holmium complexed with ligands containing oxygen or nitrogen donor atoms. The ideal irradiation target should be thin with a large surface area such that the recoil range of the formed radioisotope product exceeds the thickness of the target and the product radioisotope can be ejected into the capture matrix. With the mentioned experimental setup and procedure, most likely only the radioisotopes formed on the surface of the packed powder target in contact with the capture matrix had the opportunity to recoil, be ejected and separated from the target by the capture matrix. The recoil range of the formed radioisotopes below the surface in contact with the capture matrix would be small compared to the distance from the capture matrix, leading to retention of the formed product in the target matrix. A large surface area of the target in contact with the capture matrix leads to an increase of the formed radioisotope product having the opportunity to recoil into the capture matrix, resulting in higher enrichment and an increase in specific activity. In an effort to look into diverse irradiation targets containing a high lanthanide content, larger lanthanide containing surface area and higher stability towards the irradiation field, the synthesis of additional target material that would fit into the mentioned criteria was investigated.

One class of material that was appealing and considered as a promising agent for intra-arterial therapy and the treatment of liver malignancies was: radioactive holmium acetylacetone microspheres (HoAcAc-MS). The microspheres are loaded with holmium acetylacetonate (an irradiation target used in Example 3, with promising results, Table 3) and prepared by a solvent evaporation method

REFERENCES

1. Vente M A D, Nijsen J F W, Roos R, et al (2009) Neutron activation of holmium poly(L-lactic acid) microspheres for hepatic arterial radioembolization: a validation study. Biomed Microdevices 11:763-772. doi: 10.1007/s10544-009-9291-y
2. Mumper R J, Jay M (1992) Poly(L-lactic acid) microspheres containing neutron-activatable holmium-165: a study of the physical characteristics of microspheres before and after irradiation in a nuclear reactor. Pharm Res 9:149-154.
3. Zielhuis S W, Nijsen J F W, de Roos R, et al (2006) Production of GMP-grade radioactive holmium loaded poly(L-lactic acid) microspheres for clinical application. Int J Pharm 311:69-74. doi: 10.1016/j.ijpharm.2005.12.034
4. Nijsen J F, Zonnenberg B A, Woittiez J R, et al (1999) Holmium-166 poly lactic acid microspheres applicable for intra-arterial radionuclide therapy of hepatic malignancies: effects of preparation and neutron activation techniques. Eur J Nuc Med 26:699-704.

5. Bult W, Seevinck P R, Krijger G C, et al (2009) Microspheres with ultrahigh holmium content for radioablation of malignancies. Pharm Res 26:1371-1378. doi: 10.1007/s11095-009-9848-8]. Previous studies performed concluded that HoAcAc-MS can endure neutron activation with a nominal thermal neutron flux of $5\times10^{12}$ n·cm$^{-2}$s$^{-1}$ and heating to 200° C. and still maintain their structural integrity [Ref: Vente M A D, Nijsen J F W, Roos R, et al (2009) Neutron activation of holmium poly(L-lactic acid) microspheres for hepatic arterial radioembolization: a validation study. Biomed Microdevices 11:763-772. doi: 10.1007/s10544-009-9291-y]. In order to further develop an irradiation target that is porous and has a large surface area in contact with the capture matrix we developed an irradiation target by coating an inert solid support resin (Styrene divinylbenzene XAD-4 resin) with a Poly-vinyl Alcohol (PVA)/lanthanide mixture. The following procedure was used for the synthesis of Holmium Acetylacetonate polyvinyl alcohol XAD-4 resins: Similar to the HoAcAc PVA material synthesis, 0.5130 g of HoAcAc was dissolved in 9.2 mL chloroform (solution A). 1.2664 g of PVA was dissolved in 90 mL boiling H2O (solution B). Solution A was added to Solution B and 2.0394 g of cleaned XAD-4 resin was added to the emulsion and stirred at 700 rpm at room temperature for 72 hours until the majority of the solvent evaporated. The resultant pink colored resins were collected and dried. A similar procedure was utilized for the synthesis of Holmium 8-Hydroxyquinolinate polyvinyl alcohol XAD-4 resins.

TABLE 5

Maximum Enrichment factor for lanthanide PVA XAD-4 resin

| Target Compound | Radioisotope | Enrichment Factor |
|---|---|---|
| HoAcAc PV A XAD-4 resin | $^{166}$Ho | 24.36 |

Preliminary experiments were performed using the HoAcAc PVA XAD-4 resins and the flow loop setup for Szilard-Chalmers studies. The obtained enrichment factor for the resin (Table 5) was significantly higher compared to the powder target previously used (Table 3). The resin can be used as an irradiation target for radioisotope production using the Szilard-Chalmers method in addition to other applications such as in radiopharmaceuticals for cancer therapy.

Example 5: Production of High Specific Activity $^{238}$Pu Via Continuous-Flow Szilard-Chalmers Reaction (Prophetic)

The Plutonium-238 radioisotope has a number of applications such as use in radioisotope power systems as a long-lived heat source to power space missions (Witze A (2014) Nuclear Power Desperately Seeking Plutonium. *Nat. News*) or in nuclear powered cardiac pacemakers (Huffman F N, Norman J C (1974) Nuclear-fueled cardiac pacemakers. *Chest* 65:667-672. doi: 10.1378/chest.65.6.667). The decay heat of $^{238}$Pu can be converted to electricity using radioisotope thermoelectric generator (RTG). $^{238}$Pu has a half-life of 88 years resulting in a decline in output by half over 88 years. Therefore the ability of the RTG to produce electricity declines in a slow and predictable manner. The RTG has been a power source of choice for a number of NASA's important missions into deep space were the lack of sunlight makes solar panels useless as an energy source. NASA has powered a total of 9 planetary and Apollo missions using radioisotope power systems, including the Pioneer and Voyager spacecraft. Additionally $^{238}$Pu fueled radioisotope heaters have been used on spacecraft's to warm instruments and other on-board systems. Currently $^{238}$Pu is produced by neutron bombardment of large Neptunium-237 targets for periods of up to 1 year (Howe S D, Crawford D, Navarro J, Ring T (2013) Economical Production of Pu-238. Nucl. Emerg. Technol. Sp. (NETS 2013)), according to the following mechanism:

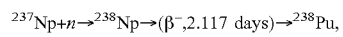

$^{237}$Np+$n$→$^{238}$Np→($\beta^-$,2.117 days)→$^{238}$Pu, such that the $^{237}$Np with a neutron capture cross section of 170 barns captures a neutron to produce $^{238}$Np which then beta decays with a half-life of 2.117 days to $^{238}$Pu. A disadvantage of this production route is that the intermediate radioisotope of $^{238}$Np has a large fission cross-section of 2600 barns therefore a majority of the $^{238}$Np has fissioned before decaying to $^{238}$Pu. The developed continuous flow setup is an ideal method for Pu-238 production. Such that upon neutron capture of $^{237}$Np, the imparted recoil energy will eject the formed $^{238}$Np into the capture matrix were it is separated from the irradiation target and instantly pumped out the reactor core. Once the $^{238}$Np has left the reactor core via the capture matrix it is no longer exposed to the neutron flux and therefore the $^{238}$Np cannot fission. Since this is a continuous process the $^{238}$Np can be collected and left to decay to $^{238}$Pu, which is the product of interest. The proposed $^{238}$Np/$^{238}$Pu production route can address the major obstacles involved in efficient $^{238}$Pu production. The Szilard-Chalmers method coupled with the continuous flow setup is more efficient in $^{238}$Pu production and as a result produces a product with higher specific activity.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A method of producing radionuclides, the method comprising
   causing a liquid capture matrix to continuously flow into a mobile phase filter compartment inside an irradiation core and then into a collection reservoir outside the radiation core while simultaneously irradiating a target comprising a target nuclide trapped in the mobile phase filter compartment by a mobile phase filter,
   wherein the target is irradiated with radiation, ionizing radiation, particles, or a combination thereof to produce radionuclides that are ejected from the target and into the liquid capture matrix such that the radionuclides are collected in the collection reservoir.

2. The method of claim 1, wherein the radionuclides are produced from the target nuclide via a reaction selected from the group consisting of a (n, γ) reaction, a (γ, n) reaction, and a (n, 2n) reaction.

3. The method of claim 1, wherein the radiation is selected from the group consisting of neutron radiation, gamma radiation, and a combination thereof.

4. The method of claim 1, wherein the radiation comprises thermal neutron radiation, epithermal neutron radiation, or a neutron radiation having a neutron energy above 0.4 eV.

5. The method of claim 1, wherein the liquid capture matrix is water.

6. The method claim 1, wherein the liquid capture matrix has a pH of about 3 to 5.

7. The method of claim 1, wherein the target nuclide has one or more organic ligands attached thereto, and the radionuclides are ejected from the target by breaking one or more bonds with the ligands.

8. The method of claim 1, wherein the target nuclide is selected from the group consisting of elements having atomic number from 21 to 102.

9. The method of claim 1, wherein the target nuclide is selected from the group consisting of $^{23}$Na, $^{31}$P, $^{37}$Cl, $^{50}$Cr, $^{55}$Mn, $^{75}$As, $^{81}$Br, $^{89}$Y, $^{98}$Mo, $^{104}$Ru, $^{127}$I, $^{152}$Sm, $^{165}$Ho, $^{174}$Yb, $^{175/176}$Lu, $^{185}$Re, $^{187}$Re, $^{194}$Pt, $^{197}$Au and $^{237}$Np.

10. The method claim 1, wherein the target nuclide is selected from the group consisting of the lanthanides and the actinides.

11. The method of claim 1, wherein the target comprises one or more organic ligands selected from the group consisting of acetylacetonate, picolinate, 8-hydroxyquinolinate, dimethylglyoximate, oxalate, 4-aminobenzoate, glycinate, and derivatives thereof.

12. The method of claim 1, wherein the target comprises a support structure, and wherein the target nuclide is in a polymer coating on the support structure.

13. The method of claim 12, wherein the support structure is a mesoporous resin.

14. The method of claim 12, wherein the support structure is a copolymer of styrene and divinylbenzene.

15. The method of claim 12, wherein the polymer coating on the support structure has a thickness that is less than a recoil range of the target nuclide.

16. The method of claim 12, wherein the target nuclide is $^{237}$Np, and
wherein the radionuclide is $^{238}$Np that decays to produce $^{238}$Pu.

17. The method of claim 12, wherein the target nuclide is $^{96}$Mo, and wherein the radionuclide is $^{99}$Mo that decays to produce $^{99m}$Tc.

18. The method of claim 1, wherein the target has a solubility in the capture matrix of about 0.001 M or less at room temperature.

19. The method of claim 1, wherein the enrichment factor is from 3 to 30.

* * * * *